United States Patent [19]
Johansson

[11] 3,743,900
[45] July 3, 1973

[54] SUPPLEMENTAL WHEEL-SLIP CONTROL SYSTEM

[75] Inventor: August V. Johansson, Erie, Pa.

[73] Assignee: General Electric Company, Erie, Pa.

[22] Filed: Mar. 21, 1972

[21] Appl. No.: 236,685

[52] U.S. Cl. .................. 318/52, 318/112
[51] Int. Cl. .............................. H02p 5/52
[58] Field of Search ................ 318/52, 112

[56] References Cited
UNITED STATES PATENTS

| | | | |
|---|---|---|---|
| 3,614,564 | 10/1971 | Hirotsu | 318/52 |
| 3,210,630 | 10/1965 | Zelina | 318/52 |
| 3,437,896 | 4/1969 | Hoge | 318/52 |
| 2,543,622 | 2/1951 | Edwards et al. | 318/52 |
| 3,378,743 | 4/1968 | Weisner | 318/52 |
| 3,663,875 | 5/1972 | Ashiya | 318/52 |
| 3,296,510 | 1/1967 | Stamm | 318/52 |
| 3,274,469 | 9/1966 | Tsuboi et al. | 318/52 |

Primary Examiner—T. E. Lynch
Attorney—Walter C. Bernkopf et al.

[57] ABSTRACT

A supplemental system for rapid response, wheel-slip control of a traction vehicle. A reduction in the motor armature current, brought about by the acceleration of a traction motor driving a pair of slipping wheels, generates a signal which is used to temporarily reduce power to the motor and prevent further slippage. Since the motor currents are high at low speeds, the sensitivity is greatest, and rapid correction response is obtained at low vehicle speeds. At higher speeds, the motor current is less, and a supplemental system is desirable.

7 Claims, 3 Drawing Figures

SUPPLEMENTAL WHEEL-SLIP CONTROL SYSTEM

BACKGROUND OF THE INVENTION

This invention relates generally to electric motor control systems and more particularly to wheel-slip control of electric traction vehicles operating at low speeds.

Loss of adhesion between the wheels of a locomotive and the rails upon which they are running is a serious problem presented to railroads which may result in damage to equipment and train delay. Such loss of adhesion, which may be caused by wheel slippage during acceleration in motoring, or by wheel sliding during dynamic braking, is due to excessive propulsive or braking torque on the powered wheels with respect to the adhesion between powered wheels and rail. It is common practice to reduce the propulsive or braking torque applied to traction motors driving the axles on a locomotive upon detection of loss of adhesion between driver wheels and rail in order to correct a wheel slippage condition.

Conventional wheel slip systems detect a slippage condition by comparing the traction motor voltages, currents, or speeds, depending on the degree of control desired, the motor arrangement, and the speed range of operation.

Where differential armature voltage between traction motors is utilized to indicate wheel slip, very low speed detection is relatively insensitive since the motor voltages are relatively low at low speeds. Further, when the motor connections are changed from series-parallel to parallel as the speed is increased, all motors are in parallel and therefore no voltage differentials between motors are obtainable, therefore rendering this type of system useless at high speeds.

Systems for detecting load unbalance between traction motors by comparing currents, decrease in sensitivity as the speed increases, since in a traction motor the current is an inverse function of speed.

A compromise system for use over a wide range of speeds derives from each axle a signal proportional to the speed of the axle, and compares these signals to determine whether or not corrective action should be initiated. Such a system must necessarily wait for a differential of wheel speed to develop before it can begin to correct the slip. Also, the signal from the axle alternators used in the system is relatively small at low speed under high adhesion conditions, resulting in somewhat less sensitivity.

During periods of low speed full power operation, the motor current is higher, and hence the slippage of wheels is more likely to occur than at higher speeds. Further, as the wheels commence to slip, the coefficient of friction between them and the rails decreases and the acceleration rate of a slipping wheel will be very high. There is, therefore, a need for rapid detection and correction of small slips to minimize the speed reached by the slipping wheel set and reduce the total time at reduced power before full power can be restored.

It is therefore an object of this invention to provide a wheel slip control system which is highly effective at low speeds of a traction vehicle.

Another object of this invention is the provision for rapid detection and correction of wheel slippage.

Yet another object of this invention is the provision for the rapid and automatic reduction of power to electric motors driving the axles of slipping wheels.

Still another object of this invention is the prevention of a wheel slippage recurrence resulting from resumption of power to the motors.

A further object of this invention is the provision for a wheel slip control system which is simple and economical to manufacture and extremely functional in use.

These objects and other features and advantages become more readily apparent upon reference to the following description when taken in conjunction with the appended drawings.

SUMMARY OF THE INVENTION

In accordance with one aspect of the invention, each parallel motor circuit of a traction vehicle includes a primary winding of a rate transformer. The secondary windings thereof are connected in parallel to the gate of a transistor whose collector-emitter circuit reduces a reference current, and consequently generator excitation and motor speed, during periods when the transistor is conducting. A capacitor, shunting the collector-emitter, provides memory to the system by allowing continued reduction of reference current for a short period and a gradual resumption of power to the motors after the transistor ceases to conduct.

No time-delaying comparisons are necessary since the individual rate transformer signals act independently to reduce excitation. The use of no moving parts allows a quicker response to the signals. And, since the motor armature currents, and hence the generated signals, are greatest at low speeds, rapid correction response is obtained at low vehicle speeds.

In the drawings as hereinafter described, a preferred embodiment and a modified embodiment are depicted; however, various other modifications and alternate constructions can be made thereto without departing from the true spirit and scope of the invention.

DESCRIPTION OF THE PREFERRED EMBODIMENT

Figure 1:
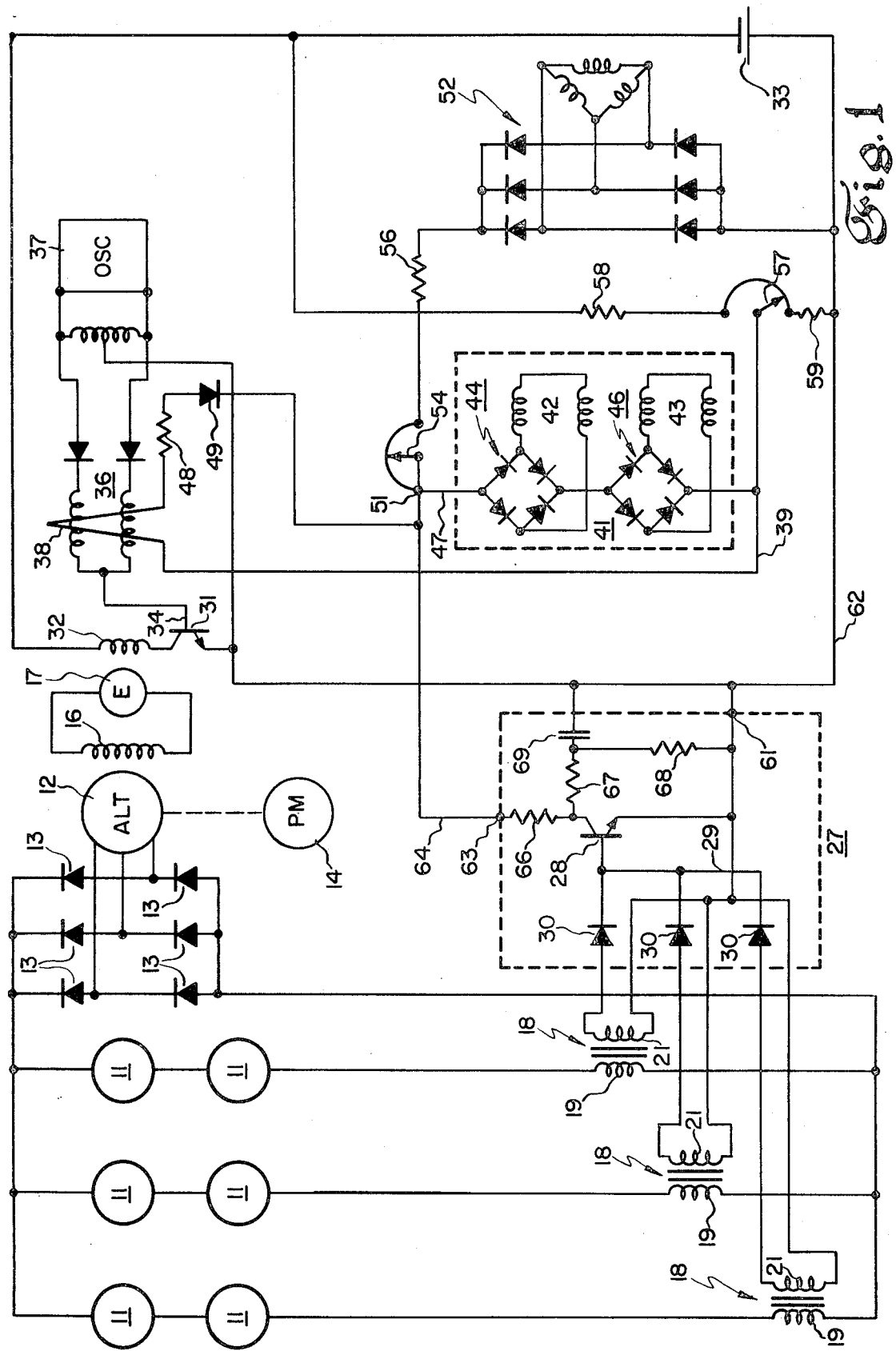
FIG. 1 is a schematic circuit diagram of a wheel-slip control system constructed in accordance with the preferred embodiment of this invention.

Reference is now made to FIG. 1 which illustrates a common electric locomotive drive arrangement wherein a plurality of d-c traction motors 11 are connected in a series-parallel arrangement, with current being provided by a traction alternator 12 through rectifiers 13. The alternator is driven by a prime mover 14 such as a diesel engine.

Field coils 16 of the alternator 12 receive a d-c current from the output of an exciter 17 which is regulated by an excitation control system described more fully hereinafter.

The series-parallel arrangement shown is commonly employed at starting and at low speeds of diesel electric locomotives. It is during these operational periods that the subject invention is best utilized, since the sensitivity thereof, and also the likelihood of a slippage occurrence is greatest at low speeds.

Slippage detection and correction at the higher locomotive speeds is quite effectively controlled by conventional systems such as that described in U.S. Pat. No. 3,210,630 issued to William B. Zelina on Oct. 5, 1965 and assigned to the assignee of this invention. The subject invention is not intended to supplant such conventional systems but only to supplement them at low speeds wherein greater sensitivity and control is desired. At low speeds, particularly those below the minimum continuous speed of a locomotive, high tractive efforts are involved and wheel slippage is likely to occur. When it does, the very earliest possible detection and correction will help in preventing excessive speed excursions of the slipping wheels. By so limiting any speed excursion, earlier power restoration is obtained with consequent greater continuity of maximum power application.

The earliest possible detection of a slip can be achieved by detecting the rate-of-change of speed of any of the driving wheels, which change results in a change in motor armature current. Therefore, a slip can be detected by measuring the rate-of-change of motor current with a rate transformer 18 whose primary 19 carries the motor current and whose secondary 21 has induced therein a proportional voltage.

In the preferred embodiment of FIG. 1 the rate transformers 18 are connected, one in each parallel circuit of a series-parallel arrangement typical for low speed operation. As the motor speeds are increased, the motors are switched into a purely parallel arrangement, half of the circuits of which contain the rate transformers, which continue to operate. However, at higher speeds the rate transformer detection system will become proportionately less sensitive due to the decreased motor currents, and relatively few slips will be detected by the subject system. Nevertheless, no attempt is made to remove the rate transformers from the circuits during such periods of lower utility, since no harm is caused by their operation.

Figure 2:
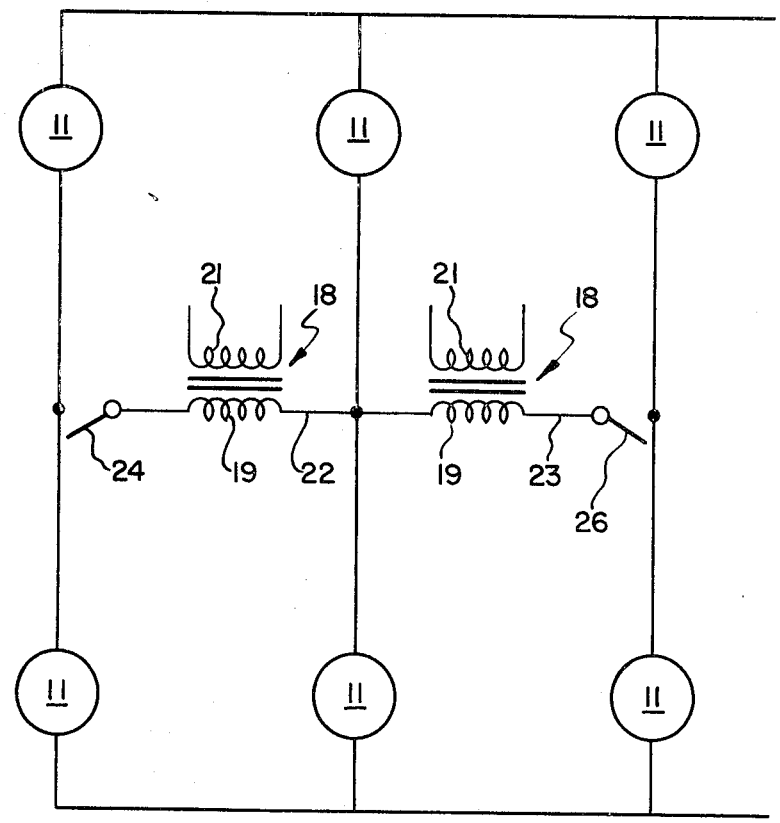
FIG. 2 is a partial schematic circuit diagram thereof constructed in accordance with a modified embodiment of this invention.
Figure 3:
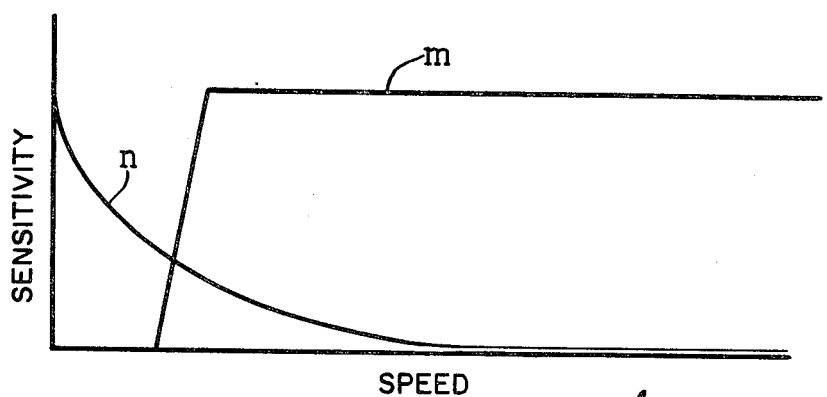
FIG. 3 is a graphic illustration of the sensitivity of the system and that of a complementary conventional system as they relate to vehicle speed.

A modified installation is shown in FIG. 2 wherein traction motors are connected in a series-parallel arrangement with power ties 22 and 23 and their associated contactors 24 and 26 coupling the parallel circuits to establish a common potential at the respective midpoints thereof. A power tie circuit is one method of minimizing wheel speed excursions due to loss of adhesion by balancing current flow in the parallel circuits. When any one of the motors accelerates because of wheel slippage, a current will flow in the associated power tie with its rate-of-change being proportional to that of the slippage. Detection can thus be made by the rate transformers 18 in a manner similar to that hereinbefore described.

Referring again to FIG. 1, a rate-of-change panel 27, shown in dashed lines, comprises a fundamental position of the subject invention. Leading into the panel are the outputs from the secondary coils 21 of the rate transformers 18, the outputs being connected in parallel to the base of a transistor 28 along line 29. Since the secondary voltage in any of the rate transformers will reverse polarity when there is an increase of motor current, a diode 30 is provided in each circuit to block such voltages, and to prevent the outputs thereof, from being dissipated to the other transformers.

The rate-of-change panel 27 is coupled to and is designed to operate in combination with a conventional excitation control system of the type shown, for example, in U.S. Pat. No. 3,621,370 issued to Thomas L. Vandervort on Nov. 16, 1971 and assigned to the assignee of this invention.

The basic system provides for the collector-emitter of a field transistor 31 to be in series with an exciter field 32 across a d-c potential 33. By this arrangement, current passing through the field can be controlled by adjusting the base-to-emitter current of the field transistor 31. This current flow through the exciter can be turned on and off rapidly by applying and removing the signal to the base-emitter circuit 34. The average current resulting from the switching action sets the level of excitation to the exciter 17 and hence to the alternator 12.

Modulation of the signal to the base emitter circuit 34 is accomplished by a pulse-width modulator 36 with a d-c voltage being supplied thereto by an oscillator 37 to be used as a turn-on signal on the field transistor 31. The pulse-width modulator (PWM) is a self-saturating reactor with several d-c control windings and one a-c winding. Control of polarity and the level of current flow through these windings determines the pulse width. The wider the pulse width the greater the time duration that the field transistor is turned on during each half cycle of the oscillator, and therefore, the higher the excitation level.

The direct current in the PWM control windings 38 receives signal inputs from various feedback sources in the control system, some of which are arranged for "turn on" effect and others for a "turn off" effect. One of such input signals is an "error signal" received along line 39 from a mixer circuit 41 comprising two saturable reactors, ACCR 42 and VCR 43, which measure the generator output in representative terms of amperes and volts respectively, and associated rectifier bridges 44 and 46 connected in series.

A reference current is supplied along line 47 to the mixer circuit 44 for comparison with the current outputs of the ACCR 42 and VCR 43. The circuit operation is such that the "error signal" coming from the mixer circuit 41 along line 39 will be zero until the current output of the ACCR or VCR is greater than the reference current. If both are greater than the reference current, then the greater of the two will actually supply current to the PWM winding 38. At the point where the larger measuring reactor current is greater than the reference current, regulation begins with the "error signal" passing through the PWM control winding 38, a calibrating resistor 48, a blocking diode 49 and back to the terminal 51 to complete a loop circuit. The amount of current flow in this circuit is a result of the mixer circuit 41 and the reference signal in line 47.

The reference current supplied is a function of the engine speed since the current is supplied by an engine-driven tachometer generator 52. A rheostat 54 with resistor 56 provides a means of calibrating the reference current entering line 47.

Another device which affects the reference current is the load control potentiometer (LCP), 57, which is an integral part of the engine governor. If the governor has supplied full fuel to the engine and the electrical horsepower demand is still greater than the engine capability, the engine would begin to slow down. However, the governor will tend to hold the engine speed constant by adjustment of the LCP. The increased bias voltage reduces the reference current and with it the electrical demand. Resistors 58 and 59 serially connected with the LCP between terminals of the battery 33 limit the current through the load control potentiometer 57 and determine the value of the reference bias voltage.

Reference is now made back to the rate of change panel 27, whose purpose is also to change the reference current entering line 47, and in particular to change it in response to traction wheel slippage. In addition to the parallel inputs to the base of the transistor 28 along line 29, the rate-of-change panel has a terminal 61 coupled to the negative side of the power source by line 62, and a terminal 63 coupled to the terminal 51 by line 64. Within the rate-of-change panel 27, the emitter collector of transistor 28 is serially connected with a resistor 66 between terminals 61 and 63. Shunting the emitter-collector circuits are the series resistors 67 and 68, and a capacitor 69 shunts the resistor 68.

In operation, a slip on any of the driven axles will result in a reduction of motor current, developing a voltage in the secondary coil of the associated rate transformer. Such a voltage will turn on the transistor 28 in the rate-of-change panel, shorting resistor, 67 and 68 to increase the current bled from the reference circuit and, therefore, reduce the current through the mixer circuit, resulting in a strong turn-off signal in the pulse width modulator, to reduce the exciter, alternator and motor outputs.

During the time that the transistor 28 is turned on, the capacitor 69 will discharge without effect, but when it shuts off, the capacitor will begin to recharge through the resistors 66 and 67, slowly reducing the amount of bled-off reference current so that restoration of power will gradually occur. Since the signal from the rate transformer is of very short duration, the capacitor 69 is needed to provide a memory, and allow a continued reduction of the reference current so that motor power is sufficiently reduced to correct the slip.

As stated hereinbefore, this system is intended to be used as a supplemental system at low speeds. System sensitivity in relation to vehicle speed is shown in the representative graph at FIG. 4. Curve M represents the sensitivity of a conventional system such as that described in the Zelina patent referred to hereinbefore. As can be seen, at very low speeds the system has little or no sensitivity, whereas at higher speeds the sensitivity is sufficient. On the other hand, sensitivity of the subject system is highest at low speeds and insufficient at higher speeds, as can be seen by the curve N. Using the systems as complementary allows adequate control over the entire speed range of the vehicle.

What I claim as new and desire to secure by Letters Patent of the United States are:

1. A supplemental wheel slip control system for use at low speeds on a traction vehicle of the type having a traction motor driving a wheeled axle and being powered by voltage generation means having excitation control means, said system comprising:
   a. a d-c motor whose armature current varies inversely with armature speed;
   b. a rate transformer having a secondary coil and a primary coil, said primary coil being serially connected in the circuit of said armature so as to be responsive to change in armature current of said traction motor; and
   c. a transistor whose gate is connected to the output of said secondary coil and whose collector emitter completes an impedance bleed-off circuit in parallel connection with said excitation control circuit; whereby when the speed of said wheeled axle rapidly increases the corresponding reduction in motor armature current causes said transistor to conduct and bleed off current from said excitation means to reduce the current from the voltage generation means, and hence the speed of the traction motor, until said transistor ceases to conduct at the cessation of motor armature current reduction.

2. A supplemental wheel slip control system as set forth in claim 1 and including a capacitor and an impedance shunting said collector-emitter so as to provide a gradual reduction of current flow in the bleed-off circuit when the transistor ceases to conduct.

3. A supplemental wheel slip control system as set forth in claim 1 wherein a plurality of rate transformers are applied to a plurality of parallel motor circuits with the primary coil of each of said rate transformers connected serially in one of said parallel motor circuits.

4. A supplemental wheel slip control system as set forth in claim 3 wherein the secondary coils of said plurality of rate transformers are connected in parallel to a single transistor.

5. A supplemental wheel slip control system as set forth in claim 4 and including rectifier means connected to said secondary coils to prevent the outputs thereof from being dissipated to each other.

6. A supplemental wheel slip system as set forth in claim 1 wherein said excitation control means comprises an exciter whose output provides field current to the voltage generation means and whose own field is connected in series with a power source and the collector-emitter of a field transistor whose gate is connected to a modulation circuit.

7. A supplemental wheel slip system as set forth in claim 6 wherein said modulation circuit comprises a pulse width modulator whose a-c winding is connected to the field transistor gate and whose d-c winding receives an output signal from a comparison circuit having a reference current input, said reference current input being connected in parallel with said bleed-off circuit.

* * * * *